United States Patent
Zimmerman et al.

(10) Patent No.: US 12,326,779 B2
(45) Date of Patent: Jun. 10, 2025

(54) FAULT TOLERANT BIG DATA PROCESSING

(71) Applicant: LiveRamp, Inc., San Francisco, CA (US)

(72) Inventors: Adam Zimmerman, Conway, AR (US); Pavan Marupally, Conway, AR (US); Joseph Shannon Duncan, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 56 days.

(21) Appl. No.: 18/020,896

(22) PCT Filed: Aug. 2, 2021

(86) PCT No.: PCT/US2021/044177
§ 371 (c)(1),
(2) Date: Feb. 10, 2023

(87) PCT Pub. No.: WO2022/039917
PCT Pub. Date: Feb. 24, 2022

(65) Prior Publication Data
US 2023/0305918 A1    Sep. 28, 2023

Related U.S. Application Data

(60) Provisional application No. 63/068,641, filed on Aug. 21, 2020.

(51) Int. Cl.
*G06F 11/00* (2006.01)
*G06F 11/07* (2006.01)
*G06F 16/174* (2019.01)

(52) U.S. Cl.
CPC ...... *G06F 11/0793* (2013.01); *G06F 11/0727* (2013.01); *G06F 16/1744* (2019.01)

(58) Field of Classification Search
None
See application file for complete search history.

(56) References Cited

U.S. PATENT DOCUMENTS 9,286,044 B2    3/2016    Boehm et al.
9,910,860 B2    3/2018    Eltabakh et al.
(Continued)

FOREIGN PATENT DOCUMENTS

JP    2010092222 A    4/2010
JP    2012160013 A    8/2012
(Continued)

OTHER PUBLICATIONS

Google Scholar/Patents search—text refined (Year: 2024).*
(Continued)

*Primary Examiner* — Christopher S McCarthy

(57) ABSTRACT

A method for improving fault tolerance of MapReduce computing systems processing extremely large data sets employs a custom mapper script that outputs the results to the shuffle and reduce processes. The Reducer writes its results into multiple files that are then compressed. The resulting files are processed by a map-only Reducer job that aggregates and reduces the results of a single file into a single output. The non-block compression prevents the file from being split across multiple mappers. The job can recover if a single mapper fails without requiring that each Map node be rerun, thus improving fault tolerance.

12 Claims, 2 Drawing Sheets

(56) References Cited

U.S. PATENT DOCUMENTS

| 11,061,736 | B2* | 7/2021 | Satish | G06F 9/5066 |
| 2017/0039236 | A1* | 2/2017 | Li | G06F 9/5044 |
| 2019/0266154 | A1* | 8/2019 | Wu | G06F 16/2465 |

FOREIGN PATENT DOCUMENTS

| JP | 2013541057 A | 11/2013 |
| JP | 2014123365 A | 7/2014 |
| JP | 2019204433 A | 11/2019 |
| WO | 2015037205 A1 | 3/2015 |

OTHER PUBLICATIONS

Google Scholar/Patents search—text refined (Year: 2025).*
English translation of Office action for corresponding Japanese Patent Application No. 2023-512342, dated Mar. 7, 2025.

* cited by examiner

FAULT TOLERANT BIG DATA PROCESSING

CROSS-REFERENCE TO RELATED APPLICATIONS

This application claims priority from U.S. provisional patent application No. 63/068,641, filed on Aug. 21, 2020. Such application is incorporated by reference as if fully set forth herein.

BACKGROUND

MapReduce systems provide a framework for parallelizing processing tasks to be performed on very large data (i.e., "Big Data") sets on a computing cluster. The MapReduce framework assigns processing resources (processors or processor clusters in a cloud environment) to function as Mappers and Reducers, which execute customizable Map functions and Reduce functions, respectively. Mappers operate in parallel to process input data according to the Map function, and Reducers operate in parallel to process Mapper output according to the Reduce function, to produce output data from the MapReduce program.

The Map function performs filtering and sorting, thereby producing key-value pairs. A Shuffle step redistributes data based on the keys such that all data belonging to one key is located on the same worker node in the distributed computing cluster for the Reduce function. Then the Reduce function is a summary procedure applied to the key-value pairs, converting the key-value pair sets into a final key-value pair set. The MapReduce framework orchestrates the various tasks running in parallel, managing data transfers between the various parts of the system. It may be seen that although the MapReduce framework is inefficient in the sense that it requires multiple instances of the reduction process to be run, its highly parallelized structure allows operations on data sets that would simply be too large to process on traditionally designed frameworks. This framework thus exchanges computational efficiency on individual processors for increased parallelization, which leads to improved total throughput for many Big Data applications.

In a simplistic example given for purposes of illustration, a MapReduce program may count the number of appearances of each word that occurs in a set of documents. The Map function assigns each unique word as a key, and counts each appearance of each word in a portion (i.e., a subset) of the one or more documents in the subset of documents. The count then becomes the value in each key-value pair. The input data set is divided into splits such that each Mapper counts the appearances of words in a subset of the document set, and the Mappers operate in parallel to count the word appearances in the entire data set in a distributed fashion. It may be understood that terabytes or even petabytes of data may be processed in this fashion, provided there are enough processors or processor clusters each applying the Map function to a particular subset of the data set. The Shuffle stage delivers the key-value pairs from the Mappers to the Reducers, with each Reducer being responsible for a particular set of keys (i.e., a particular subset of words out of the total set of unique words that occur in the input document set). The Reducers operate in parallel to compute the total counts of all the words in the data set in a distributed fashion. The Reduce function sums the values received from all of the Mappers for a particular key, outputting the sum as the total count of appearances of that particular word in the input document set. The output data from all of the Reducers, organized by key, thus contains a total count of appearances of each unique word in the input data set.

The usual MapReduce framework does include some minimal level of fault tolerance. For example, if a Map or Reduce worker node fails, then the work may be rescheduled so long as the input data is still available for the operation. In a traditional MapReduce process, however, a failure at a single Reduce node would typically mean that all Map nodes would need to be rerun and re-shuffled in order to recover. Given the enormous expense of using the very large, cloud-based systems that typically process these Big Data sets, this type of recovery is very expensive both in terms of computational resources and in monetary cost to the party that is utilizing those resources. Re-running the processing job after such a failure also may be impractical once data sets grow to extremely high quantities of data simply due to the time constraints. This is a result of the fact that some data results are time-sensitive, and the value of the results of the computations may be reduced or even lost entirely if the results are not delivered within the required timeframe. These are precisely the data sets most likely to experience faults during execution because of the very large number of nodes required for processing within the framework. It is thus desirable to develop a system and method for processing extremely large data sets in a MapReduce framework with improved fault tolerance to avoid these problems.

Any references mentioned in this background section are not admitted to be prior art with respect to the present invention.

SUMMARY

The present invention is directed to a system and method for improving fault tolerance of computing systems processing extremely large data sets (i.e., Big Data applications) within a MapReduce framework. In certain implementations, the system employs a custom mapper script that outputs the results to the shuffle and reduce processes. The Reducer writes its results into multiple files (alternatively known as fragments or parts) that are compressed using a non-block compression algorithm. The resulting files are then processed by a map-only reduce job that aggregates and reduces the results of a single file into a single output, which is the final output of the job.

The non-block compression in these implementations is employed to prevent the file from being split across multiple mappers. This allows an entire file to be sent to the same mapper in the next phase. By having an entire file to work with at each mapper (performed at a reduce node), the shuffle step may be skipped entirely, as it is not necessary to shuffle before joining the data to produce the final output. This saves time and thus money in the use of the MapReduce framework for these operations. In addition, the fact that no shuffle step is performed means that the job can recover if a single mapper fails without requiring that each Map node be rerun, thus greatly improving the fault tolerance of the overall system.

It may be noted that the system and method according to these certain implementations runs counter to conventional thinking in Big Data processing. A typical Big Data processing cluster (such as may be implemented using, for example, an Apache Hadoop® environment as provided by the Apache Software Foundation) operates using the traditional MapReduce functionality as described in the background above. By proceeding in ways that are different and in fact in some sense just the opposite of conventional and generally recommended methods of processing data, the present invention results in a higher stability and reliability (i.e., greater fault tolerance) in processing extremely large data sets.

These and other features, objects and advantages of the present invention will become better understood from a consideration of the following detailed description of the preferred embodiments in conjunction with the drawings and appended claims.

DRAWINGS

DETAILED DESCRIPTION OF CERTAIN EMBODIMENTS

Figure 1:
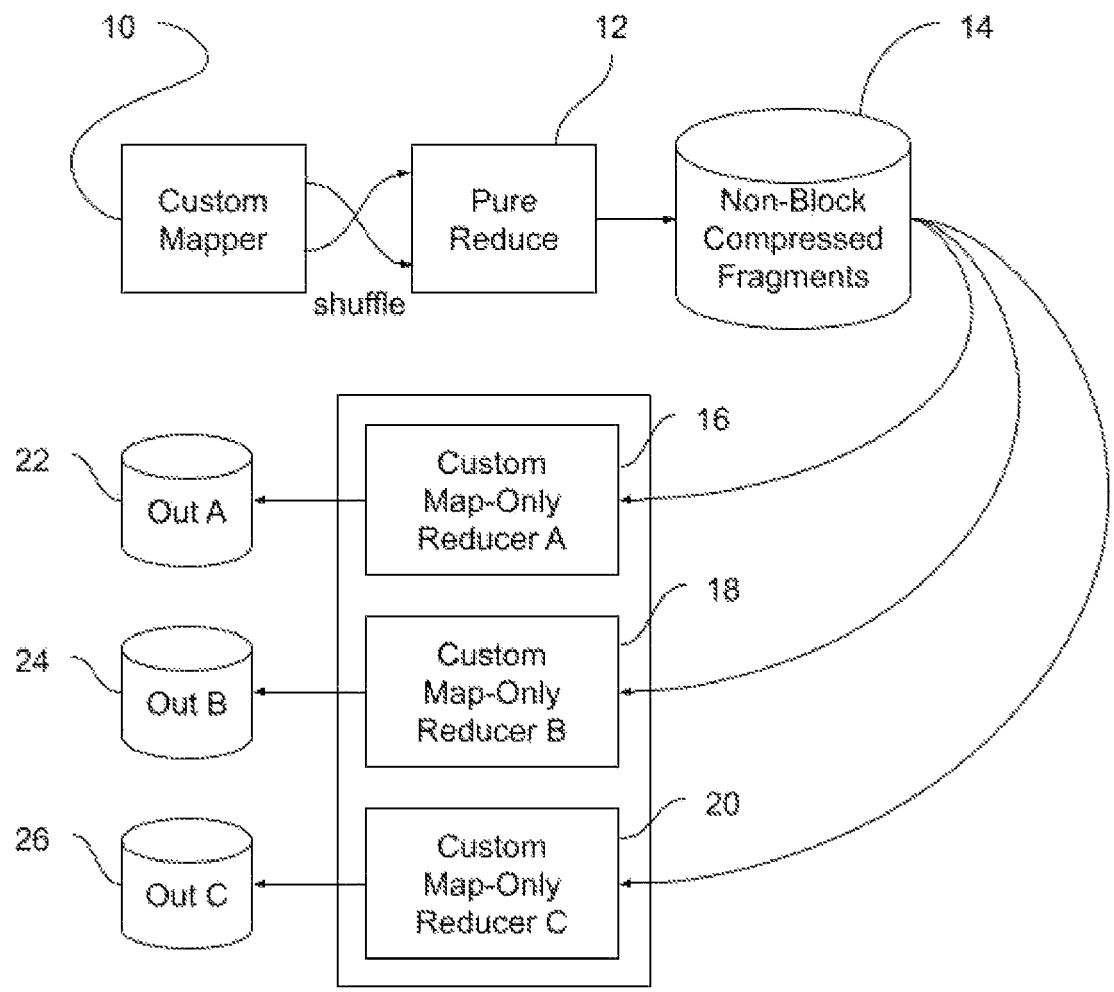
FIG. 1 is a process flow diagram for an implementation of the invention.

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

A process according to an implementation of the invention may be described with reference to FIG. 1. Processing begins with a custom mapper script 10. This script is used to drive a first reduce function 12 in a MapReduce framework. (Shown as the "Pure Reduce" 12 function in FIG. 1.) The reducer writes its results into multiple files (which may also be referred to as file fragments or file parts) at non-block compressed fragments storage 14. In this first phase, the reducer is simply the identity function, i.e., $f(x)=x$. Each of these files is then compressed using a non-block compression algorithm. The compression algorithm is non-block compression to ensure that the file cannot be split across many mappers in the next phase; instead, each of the files (or file fragments or parts) that result from the first mapper and reducer functions remain together in the next phase. This use of the entire output file for each of the first reduce functions allows for the "simulation" of a reduce operation in the next phase.

In the next phase, the resulting files are processed by one or more map-only Reduce jobs. In the example of FIG. 1, there are three such tasks: map-only Reducer A, map-only Reducer B, and map-only Reducer C, which are referred to by reference numerals 16, 18, and 20, respectively. Map-only Reducer A (16), map-only Reducer B (18) and map-only Reducer C (20) all run under the same map-only reducer job but are logical tasks separated and partitioned across the cluster where each task takes on only one part/fragment file. It will be understood that although three jobs are shown in FIG. 1 for clarity, the invention applies equally to any number of such jobs. This process aggregates and reduces the results of a single file into a single output with fewer lines of data. The map-only Reduce process is split across multiple custom map-only Reducers in the compute cluster environment, but the files are not split; each file is directed to a particular single reducer node. The final results are then simply the aggregation of the outputs of each of the Map-only reducer processes. As shown in FIG. 1, map-only Reducer A maps to Out A, map-only Reducer B maps to Out B, and map-only Reducer C maps to Out C. Out A, Out B, and Out C are referred to by reference numerals 22, 24, and 26, respectively, in FIG. 1. Again, it may be understood that although there are three outputs in this example, the invention applies equally to any number of outputs.

It may be understood that this process as just described is taking the logic of a Reducer node and running it instead as a map-only job in a manner analogous to if it were a Map node in a MapReduce framework. As a result, no shuffle is required in order to join the data at the end of the process. The outputs Out A 22, Out B 24, and Out C 26 may simply be combined directly. This saves significant amounts of time and computational resources. In addition, this allows the job to recover if a single mapper operation fails because only that mapper operation must be rerun. For example, in the example of FIG. 1, if map-only Reducer B 18 fails, then only that map-only Reduce operation needs to be rerun, while the other outputs Out A 22 and Out C 26 remain valid. Once map-only Reducer B is rerun to re-create Out B 24 after the failure and recovery, then the outputs may be combined as noted earlier.

Using the process described herein and shown in FIG. 1, extremely large data sets may be processed more efficiently because the process may aggregate and group by a large number of keys. If a single node experiences a failure during the map-only Reducer phase, it can recover and restart its portion of the process without forcing everything that came before it to be rerun. (That is, forcing each map-only Reducer to rerun.) In a traditional MapReduce system, all mappers would need to be rerun and shuffled in order to recover on a single reducer node that failed. When the size of data sets becomes extremely large, a failure becomes increasingly more likely. For this reason, the process described herein makes it practical to run some extremely large data sets in a traditional MapReduce framework cluster system, where the likelihood of a failure would become so great due to the total size of the process that it is unlikely it could ever be completed even after a number of attempts. Using conventional methods, the process would be so prone to failure that it could not be completed in a business relevant, computationally feasible timeframe. The inventors hereof have found that this approach allows shuffles of 150 Terabytes or more of data to be performed in a timely and consistent fashion, which they have found is not possible in a traditional MapReduce environment.

In one particular example, consider a case when the data is split across 15,000 files. There are thus 15,000 nodes being used, and the failure of any one of those nodes to produce uncorrupted data would force a restart in the traditional process in which every single one of the other 14,999 nodes would require re-execution. In the implementation of the present invention as described herein, only the one node where the failure occurred needs to be rerun, which means a cost and lost time reduction of greater than 99%. The fault tolerance of the system in these extremely large use cases thereby increases dramatically, and the returns increase as the size of the data set increases. The inventors have found that jobs performed with respect to extremely large data sets (150 Terabytes or more) on commercial MapReduce clusters will often fail completely due to too many retries after individual node failures. In these cases, the cost reduction by using the implementation of the present invention as described herein may be as high as fifty or sixty percent.

Figure 2:
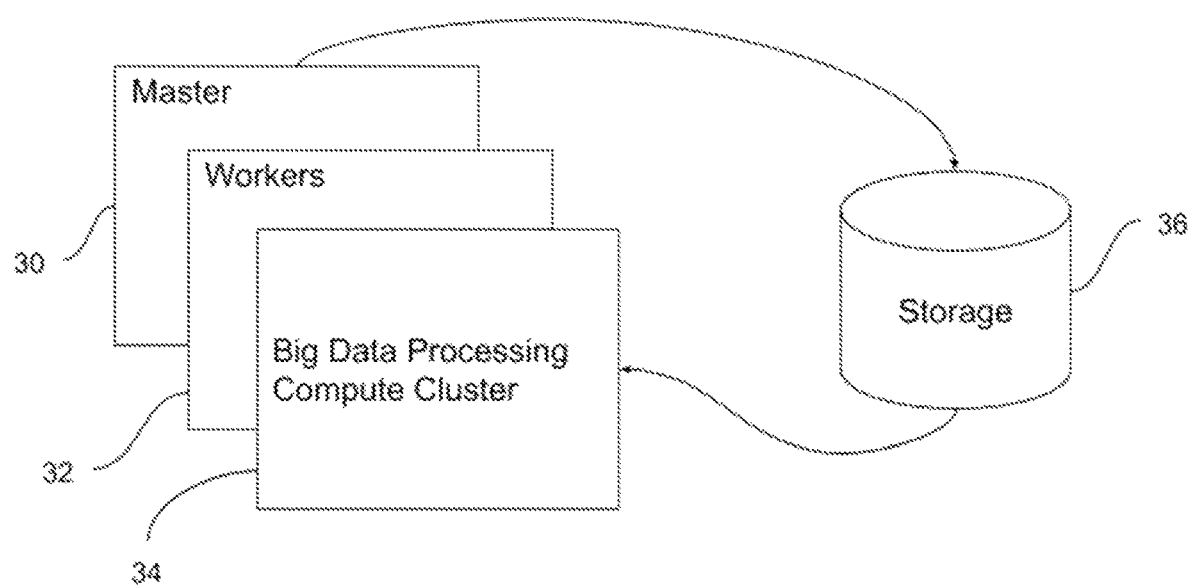
FIG. 2 is an architectural framework for an implementation of the invention.

FIG. 2 provides a general architectural view of a MapReduce system in which the invention may be implemented. This is the minimal hardware topology needed for the implementation described herein. The Custom Mapper 10, Pure Reduce 12, and Custom Map Only Reducer 16, 18, and 20 functions from FIG. 1 occur within the context of the Hadoop® cluster of FIG. 2. Apache Hadoop® is a software framework commonly used for processing extremely large data sets and which is specifically designed for distributed processing. The Out A, B, and C (reference numerals 22, 24, and 26) of FIG. 1 live within the context of distributed storage 36 of FIG. 2. Generally speaking, a Hadoop® cluster minimally requires a master server and a worker server. In this case, the cluster includes master 30, a plurality of workers 32, all within the framework of the Big Data processing compute cluster 34. The invention is not limited to implementation in a Hadoop® framework, however, and other software packages may be used in alternative implementations of the invention.

It will be apparent from the description provided herein that the Customer Mapper 10 function (the initial Map process) from FIG. 1 is scalable. A minimal architecture as shown in FIG. 2 could theoretically be used to complete the process against a small data set. For a large data set, however, the number of worker servers would be increased proportionally, which would increase the quantity of hardware components required for those workers as well. In a particular example where 150 Terabytes of data are being processed, the inventors hereof have used a master node that comprises 8 CPU cores, with 52 GB of memory and 512 GB of disk storage space. For this same example, there may be 512 workers required, with 32 cores per worker and thus 16,384 CPU cores total for the worker servers. The workers in this example may have 120 GB memory per worker server with a total of 1200 GB of storage space needed. For example, there may be 2×375 GB of solid state drive (SSD) disk storage and 450 GB of magnetic hard drive (HDD) storage per worker server. This is only one particular example, and the quantities described herein may be lowered or raised as required to accommodate specific data sets and specific data set sizes.

In one particular example using the Google Cloud Platform™ (GCP) architecture from Google, the Apache Hadoop® cluster shown in FIG. 2 may be implemented on Google Cloud Dataproc Hadoop® Clusters. The Google Cloud Dataproc is a managed Hadoop® service that allows cloud computing users to take advantage of a variety of data tools for batch processing, querying, streaming, and machine learning in a cluster computing environment. It provides custom virtual machine building, autoscaling to meet performance requirements, and automatically powers down unneeded resources. Further in this case, the distributed storage 36 may be implemented as Google Cloud storage.

Using a simple Word Count example problem, three scripts are given below for an implementation of the invention, specifically, the Mapper, Pure Reducer, and Map-Only Reducer:

```
=== Mapper
#!/usr/bin/env python2
"""mapper.py"""
import sys
for line in sys.stdin:
    line = line.strip( )
    words = line.split( )
    for word in words:
        print '%s\t%s' % (word, 1)
=== Pure Reduce
#!/usr/bin/env python2
"""pure_reducer.py"""
import sys
for line in sys.stdin:
    line = line.strip( )
```

-continued

```
    print line
=== Map Only Reducer
#!/usr/bin/env python2
"""map_only_reducer.py"""
import sys
current_word = None
current_count = 0
word = None
for line in sys.stdin:
    line = line.strip( )
    word, count = line.split('\t', 1)
    try:
        count = int(count)
    except ValueError:
        continue
    if current_word == word:
        current_count += count
    else:
        if current_word:
            print '%s\t%s' % (current_word, current_count)
        current_count = count
        current_word = word
if current_word == word:
    print '%s\t%s' % (current_word, current_count)
```

Although the implementations described above provide specific hardware and software components used to implement the invention in such implementations, the invention is not so limited. Although Hadoop® is used for processing large amounts of data, the invention in alternative implementations could be adapted to other software frameworks. Although the Google Cloud Platform is used for creating Hadoop® clusters, the invention is likewise not so limited, as any cluster of large enough size for the dataset could be used.

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, other mobile computing device, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system memories may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™, or mobile computing device operating systems such as iOS™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. When a range is used herein, all points within the range and all subranges within the range are intended to be included in the disclosure.

The present invention has been described with reference to certain preferred and alternative implementations that are intended to be exemplary only and not limiting to the full scope of the present invention.

The invention claimed is:

1. A method for improving fault tolerance and computational efficiency in a distributed parallel computing environment when processing extremely large data sets, the method comprising the steps of:

at a plurality of mappers operating in parallel in a computing cluster having at least one master node and a plurality of worker nodes configured with solid state storage devices to facilitate parallel processing, wherein each mapper is configured to perform a map function comprising filtering and sorting on a subset of an input data set to produce key-value pairs, executing a map function against each subset of the input data set of at least 150 Terabytes in parallel to produce an initial mapped data set;

executing a shuffle phase against the initial mapped data set to produce a shuffled data set by redistributing the initial mapped data set based on the key-value pairs such that all data belonging to a particular key is located on a common worker node in the distributed parallel computing environment;

at a plurality of reducers operating in parallel in the computing cluster, wherein each reducer is configured to apply a summation to its key-value pairs of the shuffled data set to convert the key-value pairs into a final key-value pair set, executing at each reducer in parallel a reduce function against the shuffled data set to produce a reduced data set comprising the final key-value pair set;

compressing the reduced data set using a non-block compression algorithm that maintains file integrity and prevents file splitting during subsequent processing to produce a plurality of compressed files, wherein the non-block compression ensures that each compressed file can be processed as a complete unit by a single map-only task;

assigning each of the plurality of compressed files to a separate map-only task within a single map-only reducer to produce a plurality of partial results in parallel;

aggregating each of the plurality of partial results to produce a final result set; and in response to detecting a failure at one of the map-only tasks, rerunning only the failed map-only task without rerunning all map and reduce functions, thereby improving fault tolerance of the distributed computing environment by eliminating redundant processing and reducing recovery time by at least fifty percent compared to traditional MapReduce implementations that require complete reprocessing after failures.

2. The method of claim 1, wherein the step of executing a map function against an input data set is performed using a custom mapper script.

3. The method of claim 1, wherein the step of executing a reduce function against the shuffled data set is performed using a custom reducer script.

4. The method of claim 1, wherein the reducer reads the shuffled data set from the shuffle phase and the mapper writes the initial mapped data set to the shuffle phase.

5. The method of claim 1, wherein the step of executing the reduce function comprises the step of applying the identity function.

6. The method of claim 1, wherein each of the compressed files are assigned in their entirety to one and only one map-only reduce task.

7. The method of claim 1, wherein the method excludes the step of performing a shuffle prior to aggregating each of the partial results to produce the final result.

8. A distributed parallel computing environment optimized for fault-tolerance processing of extremely large data sets, comprising:
  a. at least one computing cluster comprising comprising at least one master node having at least 8 processor cores and at least 50 GB of memory, and a plurality of worker nodes, each having at least 32 processor cores and at least 120 GB of memory; and
  b. at least one nonvolatile memory coupled to the master and worker nodes and comprising computer readable program code embodied in the nonvolatile memory that when executed by the processor causes the computing cluster to perform operations comprising:
    at each of a plurality of mappers operating in parallel, wherein each mapper is configured to perform a map function comprising filtering and sorting on a subset of an input data set to produce key-value pairs, executing a map function against each subset of the input data set of at least 150 Terabytes in parallel to produce an initial mapped data set;
    executing a shuffle phase against the initial mapped data set to produce a shuffled data set by redistributing the initial mapped data set based on the key-value pairs such that all data belonging to a particular key is located on a common worker node in the distributed parallel computing environment;
    at a plurality of reducers operating in parallel, wherein each reducer is configured to apply a summation to its key-value pairs of the shuffled data set to convert the key-value pairs into a final key-value pair set, executing at each reducer in parallel a map function against the shuffled data set to produce a plurality of files at a plurality of map nodes comprising the final key-value pair set;
    compressing each of the plurality of files using a non-block compression algorithm to produce a plurality of compressed files, wherein the non-block compression algorithm is configured to maintain internal references within each compressed file to enable independent processing of each compressed file without requiring decompression of other files, thereby enabling parallel recovery of individual failed map-only tasks without requiring complete reprocessing of the entire data set;
    assigning each of the plurality of compressed files to a separate map-only job from among a plurality of separate map-only jobs, wherein each of the plurality of separate map-only jobs is assigned to one of a plurality of reduce nodes to produce a partial result in parallel with each of the other separate map-only jobs;
    aggregating each of the partial results to produce a final result; and
    in response to detecting a failure at one of the map-only jobs, rerunning only the failed map-only job without rerunning all map and reduce functions, thereby improving fault tolerance of the distributed computing environment by eliminating redundant processing and reducing recovery time by at least fifty percent compared to traditional MapReduce implementations that require complete reprocessing after failures.

9. The computer system of claim 8, wherein the computer readable program code embodied in the nonvolatile memory when executed by the processor further causes the processor to perform operations comprising the step of executing the map function using a custom mapper script.

10. The computer system of claim 9, wherein the computer readable program code embodied in the nonvolatile memory when executed by the processor further causes the processor to perform operations comprising the step of executing the reducer function by applying the identity function.

11. The computer system of claim 8, wherein the computer readable program code embodied in the nonvolatile memory when executed by the processor further causes the processor to perform operations comprising the step of assigning each of the compressed files in their entirety to one and only one reduce node.

12. The computer system of claim 8, wherein the computer readable program code embodied in the nonvolatile memory when executed by the processor further causes the processor to perform operations excluding the step of performing a shuffle prior to aggregating each of the partial results to produce the final result.

\* \* \* \* \*